United States Patent Office 2,865,944
Patented Dec. 23, 1958

2,865,944
COMPLEX AMIDO-SUBSTITUTED ESTERS OF BETA-PHOSPHATO-ALPHA, BETA-OLEFINICALLY UNSATURATED MONOCARBOXYLIC ACIDS

Alan R. Stiles and Richard R. Whetstone, Denver, Colo., assignors to Shell Development Company, New York, N. Y., a corporation of Delaware No Drawing. Application December 28, 1955
Serial No. 555,757

4 Claims. (Cl. 260—461)

This invention relates to a new class of phosphorus- and nitrogen-containing compounds which have been found to be particularly useful as insecticides.

The compounds of the invention are esters of beta-phosphato-alpha,beta-olefinically unsaturated monocarboxylic acids represented by the formula

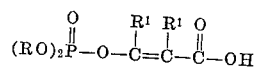

wherein R represents a hydrocarbon radical and $R^1$ represents the hydrogen atom or a hydrocarbon radical, with an aliphatic alcohol substituted by an amido group. The said amido-substituted aliphatic alcohol may be considered to have the formula HO—$R^2$-amido, wherein $R^2$ represents a divalent aliphatic hydrocarbon radical and amido represents an amido group attached to the group $R^2$ by a nitrogen-to-carbon bond. The compounds of this invention thus generically are represented by the formula

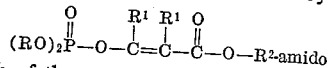

wherein each of the symbols have the respective meaning hereinbefore set out.

In these compounds, it is preferred that $R^1$ represent either a hydrogen atom or a hydrocarbon group containing from 1 to about 8 carbon atoms. $R^1$ thus includes aliphatic—including cycloaliphatic—hydrocarbon groups, such as alkyl groups of either straight-chain or branched-chain configuration, cycloalkyl groups, and their unsaturated analogs, aryl groups, and combinations thereof, such as araliphatic groups and aryl groups substituted by one or more aliphatic groups, e. g., aralkyl and alkaryl groups. Preferably, such groups contain not more than about eight carbon atoms each, considering both ring and non-ring carbon atoms. It is preferred that $R^1$ be an alkyl group, the lower alkyl groups, particularly those containing 8 carbon atoms or less each, being the most desirable members of this preferred group.

The symbol R represents the same hydrocarbon groups as are designated by the symbol $R^1$.

The symbol $R^2$ preferably represents an alkylene group, and most desirably a lower alkylene group—i. e., alkylene groups containing up to about eight carbon atoms. The group represented by $R^2$ may be of either branched-chain or straight-chain configuration. The linking valence bonds of the group $R^2$ may be on the same or on different carbon atoms.

"Amido" represents an amido group attached to the group $R^2$ by a nitrogen-to-carbon bond. By the term "amido group" is meant the monovalent residue of any primary or secondary acid amide—i. e., any radical of the formula

wherein A is a monovalent acid group and B is a hydrogen atom, a hydrocarbyl group or such a monovalent acid group as is represented by A. Included are the residues of amides of carboxylic acids (A and/or B=—C(O)$R^3$, wherein $R^3$ is a hydrocarbyl group), such as the residues of acetamide, formamide, urea, oxamide, malonamide, oxamic acid and its $R^3$ derivatives and esters, succinamic acid and its $R^3$ derivatives and esters, carbamic acid and its $R^3$ derivatives and esters (e. g., amido groups derived from the urethanes), including the aliphatic thioamides (A and/or B=—C(S)$R^3$) including thiourea. Also included are the residues of amides of aromatic acids, such as the residue of benzamide, 1-naphthamide, phthalimide, and the like. Also included are the amides of sulfonic acids (A and/or B=—SO$_2$$R^3$), including sulfamic acids and its $R^3$ derivatives and esters and the like, and derivatives of sulfamide, and its $R^3$ derivatives, the amides of phosphorus acids, such as the phosphonamides [A and/or B=—P(O)(O$R^3$)($R^3$)] the phosphoramides [A and/or B=—P(O)(O$R^3$)$_2$], and the phosphinamides [A and/or B=—P(O)($R^3$)($R^3$)], the sulfur analogs of these acids, and other acids. The group $R^2$ may be substituted by more than one amido group. A preferred subgenus of the new compounds comprises those wherein the group $R^2$ is substituted by but one amido group, and that this amido group be the residue of a primary or secondary amide of an aliphatic carboxylic acid (as previously defined herein). Still more preferable are those compounds of the said subgenus having the structure

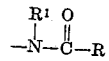

wherein R and $R^1$ have their previously stated meanings.
Examples of this new class of compounds include:
2-(2-acetamidoethoxycarbonyl) - 1 - methylvinyl dimethyl phosphate
2-(2-acetamidoethoxycarbonyl) - 1 - methylvinyl diethyl phosphate
2-(2-propionamidoethoxycarbonyl) - 1,2 - dimethylvinyl dimethyl phosphate
2-(2-benzenesulfonamidoethoxycarbonyl) - 1 - methylvinyl diethyl phosphate
2 - (2 - dimethylphosphoramido ethoxycarbonyl) - 1-methylvinyl dimethyl phosphate
2-(2-caproamidoethoxycarbonyl)-ethenyl diethyl phosphate
2-(2-acetamidopropoxycarbonyl)-1-phenylvinyl dipropyl phosphate
2-(2-diacetamidoethoxycarbonyl) - 1 - methyl - 2 - ethylvinyl dimethyl phosphate
2-[3-(N-ethylacetamido)-propoxycarbonyl] - 1 - methylvinyl dibutyl phosphate
2-(2-benzamidoethoxycarbonyl)-1-methylvinyl dimethyl phosphate Compounds of this preferred subgenus in which each of the groups, R, $R^1$, $R^2$ and $R^3$ contains no more than eight carbon atoms have been found to be highly active insecticides with excellent residual activity.

These new compounds are conveniently prepared by (a) the reaction of an amido alcohol

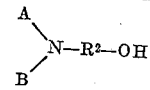

and diketene or a substituted diketene to form the corresponding beta-oxo acid amide, according to the equation

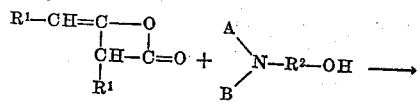

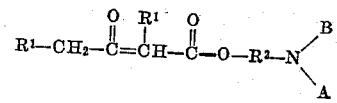

The reaction is catalyzed by acidic or basic catalysts, such as acidic or basic resins, tertiary amines, or sulfonic acids.

The reaction is conveniently conducted by slowly adding the diketene to a mixture of the amido alcohol and the catalyst, heating or cooling as necessary to maintain a moderately elevated temperature (80° C. to 125° C. is usually most satisfactory). The reaction mixture temperature is maintained for a short time—e. g., fifteen minutes to an hour—after all of the diketene has been added to insure complete reaction. The product is recovered by distillation.

(b) Reaction of the product of (a) with sulfuryl chloride to give the 2-chloro-substituted compound

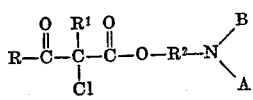

Reaction (b) is carried out according to the method described by Dey in Journal of the Chemical Society, volume 107 (1915) at page 1646 et seq., by McBeth in Journal of the Chemical Society, volume 123, page 1125 et seq. (1925), and by Allihn, Berichte der deutschen Chemischen Gesellschaft, volume 11, page 567 et seq. (1878).

(c) Reaction of the 2-chloro-substituted compound with a phosphite, $(RO)_3P$, to give the desired products.

The phosphites are a well known class of compounds, ordinarily prepared by reacting one mole of phosphorus trichloride with three moles of an alcohol or phenol in the presence of three moles of a basic hydrogen chloride acceptor (Kosolapoff, "Organic-Phosphorus Compounds," Wiley (1950) pages 184 and 185).

Reaction (c) is carried out by adding about an equimolar amount of the phosphite to the chloroester, the addition usually being made slowly so as to avoid undue temperature increase of the reaction mixture from the exothermic heat of reaction. The reaction may be started with the reactants at an ordinary temperature of about 20 to 25° C., but for the most part is conducted at a temperature between about 60° C. and 150° C. In some cases, the starting of the reaction is assisted by application of heat, and especially if large quantities of reactants are used, cooling is employed to control the temperature within the desired range. The formed alkyl chloride is preferably removed from the reaction mixture to greater or lesser extent by application of sufficient vacuum so that chloride is boiled out. When the boiling points of the formed alkyl chloride and the chloroester reactant are fairly close together, use of a distillation column for removal of the alkyl chloride is advisable for best results. Some of the higher reactants are solids at ordinary temperature, but use of an inert solvent such as xylene enables a fluid reaction system to be realized. The reaction is effected under substantially anhydrous conditions. In order to insure completion of the reaction after addition of the chloroester, the reaction mixture is heated within the indicated temperature range for a reasonable time. The formed phosphate is usually recovered by distillation under sufficiently low pressure that thermal decomposition is avoided. If desired, especially with higher compounds of the invention, crystallization or molecular distillation may be used for recovery of the phosphates.

Preparation of a typical, but non-limiting member of the new class of compounds is described in detail in the following example:

EXAMPLE I

Reaction of diketene with an amino alcohol 2-acetamidoethyl acetoacetate is made as follows: diketene (128 grams—1.52 moles) is added over a period of 1½ hours to 2-hydroxyethyl acetamide (157 grams—1.52 moles) containing 1%w triethylamine at 100° C. The reaction is moderately exothermic. At the conclusion of the addition, heat is applied to maintain the temperature at 95 to 100° C. for an additional ½ hour. The product, 2-acetamidoethyl acetoacetate, is then obtained by a very high vacuum distillation (molecular still) as a viscous liquid (213 grams—75% of theory). B. P. 150–160° C. (0.001 mm.); $n^{25}_D$ 1.4700. (Nitrogen: found 7.5%; calculated 7.5%.)

Reaction of sulfuryl chloride with 2-acetamidoethyl acetoacetate

Sulfuryl chloride (138 grams—1.02 moles) is added at 10 to 20° C. to 2-acetamidoethyl acetoacetate (191 grams—1.02 moles) in 100 ml. benzene over a period of two hours. Cooling is required. After addition is completed, the mixture is heated at 50° C. and 40 mm. for one hour to remove the by-product gases. The product is isolated by a high vacuum distillation (molecular still). Yield 184 grams (81.5% of theory). B. P. 120° C. (0.001 mm.).

| | Calculated for $NO_4C_8H_{12}Cl$ | Found |
|---|---|---|
| Chlorine, Percent w | 16.0 | 16.1 |

2-(2-actamidoethoxycarbonyl)-1-methylvinyl dimethyl phosphate is prepared by the following procedure: Trimethyl phosphite (106 grams—0.855 mole) is added over a one-hour period to 2-actamidoethyl 2-chloroacetoacetate (182 grams—0.825 mole) at about 80 to 95° C. The reaction is moderately exothermic. At the conclusion of the addition, heat is applied to maintain the temperature at 95 to 105° C. for an additional two hours. During the last hour a vacuum of 55 to 85 mm. is applied to remove the by-product methyl chloride. The product is obtained fairly pure by a high vacuum distillation (molecular still). B. P. 175 to 80° C. (0.001 mm.); $n^{25}_D$ 1.4785. Yield 160 grams, 65.8% of theory.

| | Calculated for $PNO_7C_{10}H_{18}$ | Found |
|---|---|---|
| Carbon, Percent w | 38.0 | 38.8 |
| Hydrogen, Percent w | 6.1 | 5.6 |
| Nitrogen, Percent w | 4.8 | 5.1 |
| Phosphorus, Percent w | 10.5 | 9.8 |

Many of the complex esters of the invention are liquids at ordinary temperatures of 20° C. to 25° C. although higher members are crystalline solids at such normal temperatures. The new compounds are very useful substances for a variety of applications, but are of particular utility as insecticides because they possess outstanding properties when employed as contact and stomach poisons. The compounds are highly toxic to insects, a term which is employed herein to include not only members of the class Insecta, but also related or similar non-vertebrate animal organisms belonging to the allied classes of arthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long chain fatty alcohols, alkyl aryl sulfonates, long-chain alkyl sulfonates, phenolethylene oxide condensates, and ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabedilla, and the like, as well as the various synthetic insecticides, including DDT, benzene hexachloride, thiodiphenylamine, cyanides, tetraethyl pyrophosphate, diethyl-p-nitrophenyl thio-phosphate, azobenzene and the various compounds of arsenic, lead, and/or fluorine.

The following examples demonstrate the insecticidal properties of a typical compound of this invention with a comparsion being made between the properties of these esters and those of various compounds widely used as insecticides.

EXAMPLE II

A representative compound of the invention was tested against several common insect pests, comparison being made to common insecticides widely used against such pests.

Solutions or emulsions of the representative compound was made up by employing acetone, a neutral petroleum distillate lying within the kerosene range as the solvent. These solutions or emulsions were tested for toxicity against (a) the 2-spotted spider mite (*Tetranychus bimaculatus*), (b) the pea aphid (*Macrosiphum pisi*), (c), the Mexican bean beetle larva (*Epilachna varivestis*), and (d) the hydrangea mite (*Tetranychus hydrangeae*), by spraying groups of plants infested with the insects under controlled conditions which varied from test to test only in the concentration of the toxic agent. These toxicities were compared with the toxicity, respectively, of (a) parathion, (b) nicotine, (c) the gamma isomer of hexachlorobenzene, all insecticides widely used for the destruction of the common insects tested. In each set of tests the conditions were directly comparable—i. e., the same test insect, same plant, environment, etc., were used and the concentration of active material in each case was the same.

The toxicities are expressed in terms of the relationship between the amount of standard insecticide required to produce 50% mortality of the test insects and the amount of the test material required to produce the same mortality. Assigning the standard insecticide an arbitrary rating of 100%, the toxicity of the test materials is expressed in terms of the toxicity index which compares the activity on a percentage basis with that of the standard insecticide. The results are shown in the following table:

TABLE I

| Test Insect | Pea aphid | Mexican bean beetle larva | Two-spotted spider mite | Hydrangea mite |
|---|---|---|---|---|
| Standard Insecticide | Parathion | Nicotine | Gamma Benzene Hexachloride | Parathion | Parathion |
| Compound: 2-(2-acetomidoethoxycarbonyl)-1-methyl vinyl dimethyl phosphate | 170 | 6,250 | 760 | 730 | 260 |

EXAMPLE III 2-(2-acetamidoethoxycarbonyl)-1-methylvinyl dimethyl phosphate (hereinafter designated as compound A), a representative compound of the invention, was tested to determine its residual toxicity with respect to the adults of several common insects. These tests were performed by spraying the uninfested test plants with the test compound as set out in Example II, and a given number of days thereafter infesting the plants with the test insects. The effectiveness of the test compound is expressed as the percent of the test insects (compared to untreated but equally infested test plants), the count being made 24 hours after the infestation. The details of the tests and the results thereof are summarized in the following tables:

TABLE II

[Test insect: Onion thrips (*Thrips tabaci*).]

| Concentration of active material in spray | Percent Control | | | | | |
|---|---|---|---|---|---|---|
| | ⅔ oz./100 gal. | | 3 oz./100 gal. | | 6 oz./100 gal. | |
| Time (infestation after spraying, days) | 1 | 7 | 1 | 7 | 1 | 7 |
| Compound tested: | | | | | | |
| A | 83 | 53 | 83 | 78 | 92 | 81 |
| Systox (comparison) | 69 | 42 | 80 | 64 | 90 | 60 |

TABLE III

[Test insect: Hydrangea mite. Test compound: A concentration of active material in spray: 4 oz./100 gal.]

| Time (infestation after spraying, days) | 1 | 2 | 7 |
|---|---|---|---|
| Percent control | 100 | 100 | 99 |

TABLE IV

[Test insect: Adult two-spotted spider mite.]

| Concentration of active material in spray | Percent Control | | | |
|---|---|---|---|---|
| | 1.0% | | 0.25% | |
| Time (infestation after spraying, days) | 1 | 7 | 1 | 7 |
| Compound: | | | | |
| A | 100 | 100 | 100 | 100 |
| Parathion | 99 | 62 | 97 | 36 |
| Systox | 100 | 89 | 96 | 50 |

TABLE V

Test insect: Mexican bean bettle larva.
Time of infestation: 7 days after spraying.

At a concentration of 0.035% w., compound A killed 77% of the test insects when the test plants were kept in the sun. At a concentration of 0.05% w., Parathion killed 50% of the insects under shady conditions and 2% of the insects under sunny conditions.

EXAMPLE IV

Tests were also made on compound A, Parathion and Systox under conditions such that the residual toxicity of the compounds toward the eggs, and the young hatched from the eggs, as well as the adults of two-spotted spider mites, would be measured. The time of infestation was 7 days after spraying. The results are shown in the following table: (In the table, the concentration of the test compound in the spray is given in parentheses following the percent kill.)

TABLE VI

| Compound | Percent Kill | | |
|---|---|---|---|
| A | 99 (0.02%) | 100 (0.04%) | 100 (0.08%) |
| Parathion | 50 (0.15%) | 70 (0.3%) | 88 (0.6%) |
| Systox | 83 (0.06%) | 86 (0.12%) | 98 (0.24%) |

Under the same conditions, dimethyl 1-carbomethoxy-1-propen-2-yl phosphate, a known insecticide, killed but 59% of the insects at a concentration of 0.09% and but 78% of the insects at a concentration of 0.18%.

EXAMPLE V

Compound A also was tested under conditions such that the residual toxicity thereof would be determined. For comparison, Systox, Parathion and dimethyl 1-carbomethoxy-1-propen-2-yl phosphate also were tested under the same conditions.

The tests were conducted against leafhoppers (*Erythroneura comes*) on grapes. Individual grape canes were sprayed to run-off with 3 ounces actual toxicant per 100 gallons of water. The sprays were then repeated two more times. Twenty-five adult leafhoppers were caged on each cane at intervals after each spray and counts were made 24 hours later. A summary of the results obtained are given in Table VII.

TABLE VII

| | Percent Control | | |
|---|---|---|---|
| Time (days following infestation after spraying) | 1 | 7 | 14 |
| Compound: | | | |
| A | 91 | 68 | 39 |
| Systox | 64 | 65 | 28 |
| Parathion | 68 | 9 | 4 |
| Dimethyl 1-carbomethoxy-1-propen-2-yl phosphate | 92 | 2 | 3 |

We claim as our invention:

1. A compound of the formula

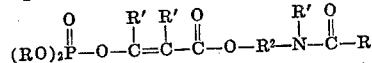

wherein R represents an aliphatic hydrocarbon radical of 1 to 8 carbon atoms, R' represents a member of the group consisting of the hydrogen atom and alkyl radicals of 1 to 8 carbon atoms and $R^2$ represents a lower alkylene radical.

2. A compound of the formula

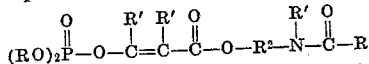

wherein R represents an aliphatic hydrocarbon radical of 1 to 8 carbon atoms, R' represents hydrogen and $R^2$ represents a lower alkylene radical.

3. A compound of the formula

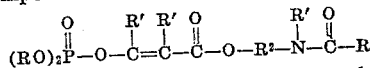

wherein R represents an aliphatic hydrocarbon radical of 1 to 8 carbon atoms, R' represents an alkyl radical of 1 to 8 carbon atoms and $R^2$ represents a lower alkylene radical.

4. 2 - (2 - acetamidoethoxycarbonyl)-1-methylvinyl dimethyl phosphate.

No references cited.